United States Patent [19]
Kamm

[11] Patent Number: 5,934,052
[45] Date of Patent: Aug. 10, 1999

[54] LAWN MOWER BAIL

[75] Inventor: Michael A. Kamm, Lyndhurst, Ohio

[73] Assignee: MTD Products Inc., Cleveland, Ohio

[21] Appl. No.: 08/959,254

[22] Filed: Oct. 29, 1997

[51] Int. Cl.$^6$ .................................................. A01D 69/10
[52] U.S. Cl. .............................. 56/11.3; 56/11.4; 56/11.6; 180/19.1; 180/19.3
[58] Field of Search ..................................... 56/11.3, 11.4, 56/11.6, 11.8, 16.7, DIG. 18; 180/19.1, 19.3

[56] References Cited

U.S. PATENT DOCUMENTS

| | | | |
|---|---|---|---|
| 4,212,141 | 7/1980 | Miyazawa et al. | 56/DIG. 18 |
| 4,335,566 | 6/1982 | Hurd | 56/11.3 |
| 4,430,848 | 2/1984 | Wistrom | 56/11.3 |
| 4,455,811 | 6/1984 | Beugelsdyk | 56/10.8 |
| 4,551,967 | 11/1985 | Murcko | 56/11.6 |
| 4,753,062 | 6/1988 | Roelle | 56/10.5 |
| 4,805,386 | 2/1989 | Urban | 56/10.8 |
| 4,930,369 | 6/1990 | Barnard et al. | 180/19.3 |
| 5,146,735 | 9/1992 | McDonner | 56/11.3 |
| 5,261,214 | 11/1993 | Wollersheim | 56/11.3 |
| 5,355,662 | 10/1994 | Schmidt | 56/11.3 |
| 5,375,674 | 12/1994 | Peter | 56/11.3 |
| 5,826,414 | 10/1998 | Lenczuk | 56/16.7 |

FOREIGN PATENT DOCUMENTS 2102901 2/1983 United Kingdom ..................... 56/11.3

Primary Examiner—Thomas B. Will
Assistant Examiner—Arpad Fabian Kovacs
Attorney, Agent, or Firm—Emerson & Associates; Roger D. Emerson; Timothy D. Bennett

[57] ABSTRACT

An improved bail is provided for use on a lawn mower. The bail includes a pivot stop member that is integral with the bail and which is positioned within a first hollow portion of a first leg of a control handle attached to the lawn mower. To stop the bail from pivoting in a first direction, the bail is released by the operator. A second end of a pivot stop member then comes into contact with the inside surface of the hollow portion of the first leg. This stops the bail from pivoting.

16 Claims, 4 Drawing Sheets

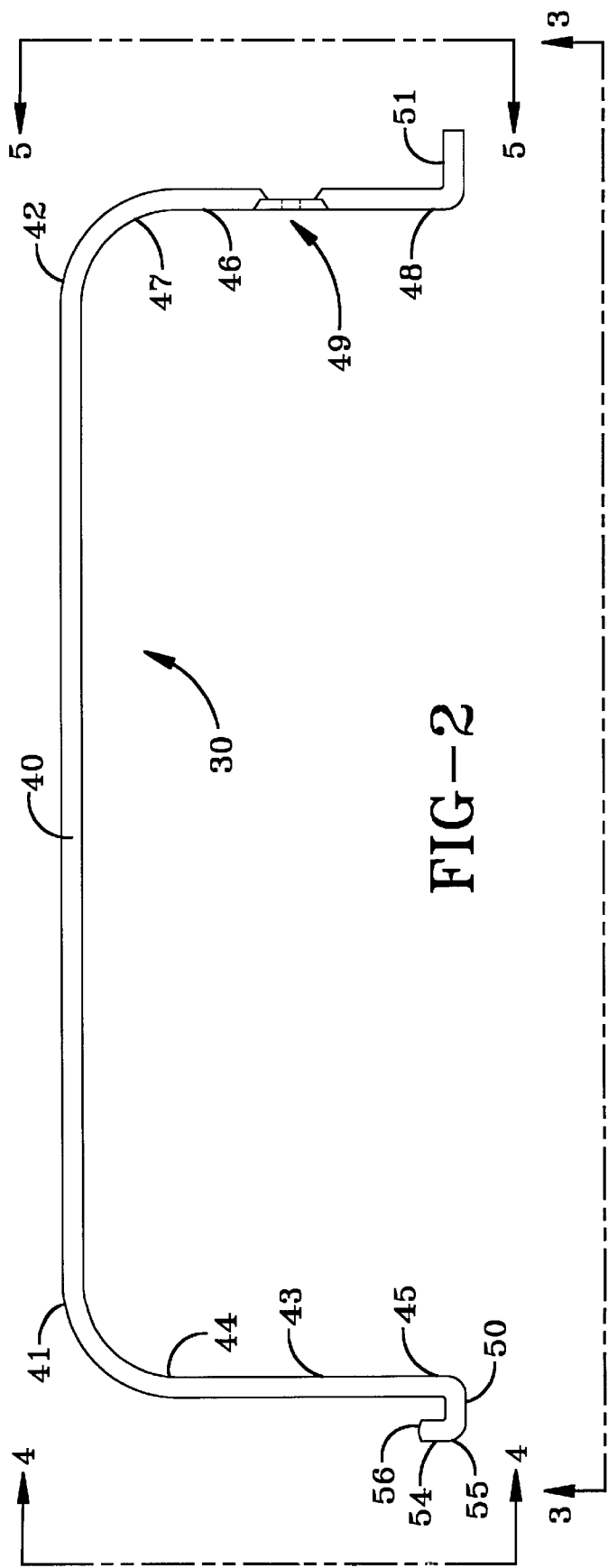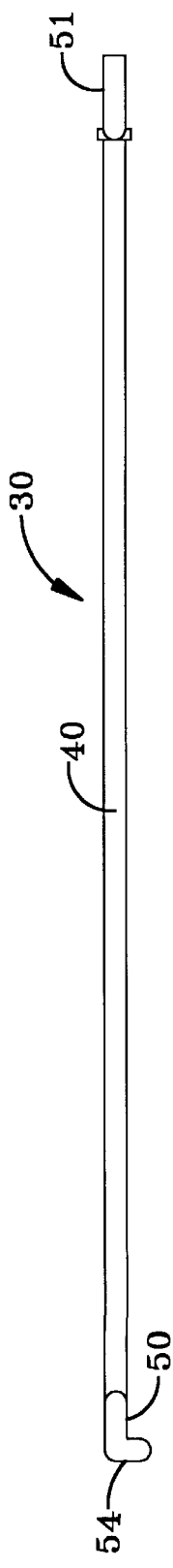

LAWN MOWER BAIL

BACKGROUND OF THE INVENTION

1. Field of Invention

This invention pertains to the art of methods and apparatuses for use in lawn mowers, and more specifically to methods and apparatuses for use with a bail used with an operator present control.

2. Description of the Related Art

It is well known to provide lawn mowers, such as walk-behind lawn mowers, with apparatuses and methods for detecting if the operator is properly positioned with respect to the lawn mower. Such apparatuses are often termed "operator present controls." Typically such operator present controls include a bail which is pivotably connected to the control handle of the lawn mower. The operator is required to hold the bail against the control handle thereby permitting the cutting blades of the mower to rotate. Should the operator release the bail, it is biased to pivot about the control handle thereby disengaging the cutting blades.

It is known in the art to combine a bail with some type of member used to stop the pivoting of the bail when the operator has released it. For example, U.S. Pat. No. 4,805,386 discloses a bail stop that includes a clip for fastening to the bail. Similarly, U.S. Pat. No. 5,261,214 discloses a bail pivot stop that snap fits to the associated bail. All such bail stops are purportedly effective in stopping the pivoting motion of the bail. However, all such bail stops are separate pieces requiring separate manufacture and increased assembly during the manufacturing process. Thus, separate bail stops become expensive additions in the lawn mower art.

The improved bail of this present invention does not require a separate bail stop. Therefore, the problems mentioned above are reduced in ways that are simple and efficient while providing better and more advantageous results.

SUMMARY OF THE INVENTION

According to one aspect of the present invention, there is provided a bail for use with an operator present control on an associated lawn mower. The bail includes a cross bar, first and second side bars operatively connected to the cross bar, first and second shafts operatively connected to the first and second side bars, and a pivot stop member rigidly connected to the first shaft. The pivot stop member is positioned within a hollow portion of the control handle of the lawn mower.

According to another aspect of the present invention, there is provided an operator present control system for use with an associated lawn mower. The operator present control system includes disengaging means for selectively disengaging the cutting blades of the lawn mower, a bail that includes a pivot stop member that is positioned within a hollow portion of the control handle of the lawn mower, and connecting means for connecting the bail to the disengaging means.

According to another aspect of the present invention, there is provided a method of stopping a bail that is used with an associated lawn mower. The method includes the steps of pivoting the bail in a first direction, contacting a pivot stop member with an inside surface of the control handle of the lawn mower, and stopping the bail.

One advantage of the present invention is that a separate bail stop is not required.

Another advantage of the present invention is that the pivot stop member is integrally formed of a single material along with the bail.

Another advantage of the present invention is that it is easy to manufacture and can be made economically.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 2 is a side elevation view of the bail of this invention showing the first and second shafts.

FIG. 3 is a bottom view of the bail taken along the line 3—3 of FIG. 2.

DESCRIPTION OF THE PREFERRED EMBODIMENT

Figure 1:
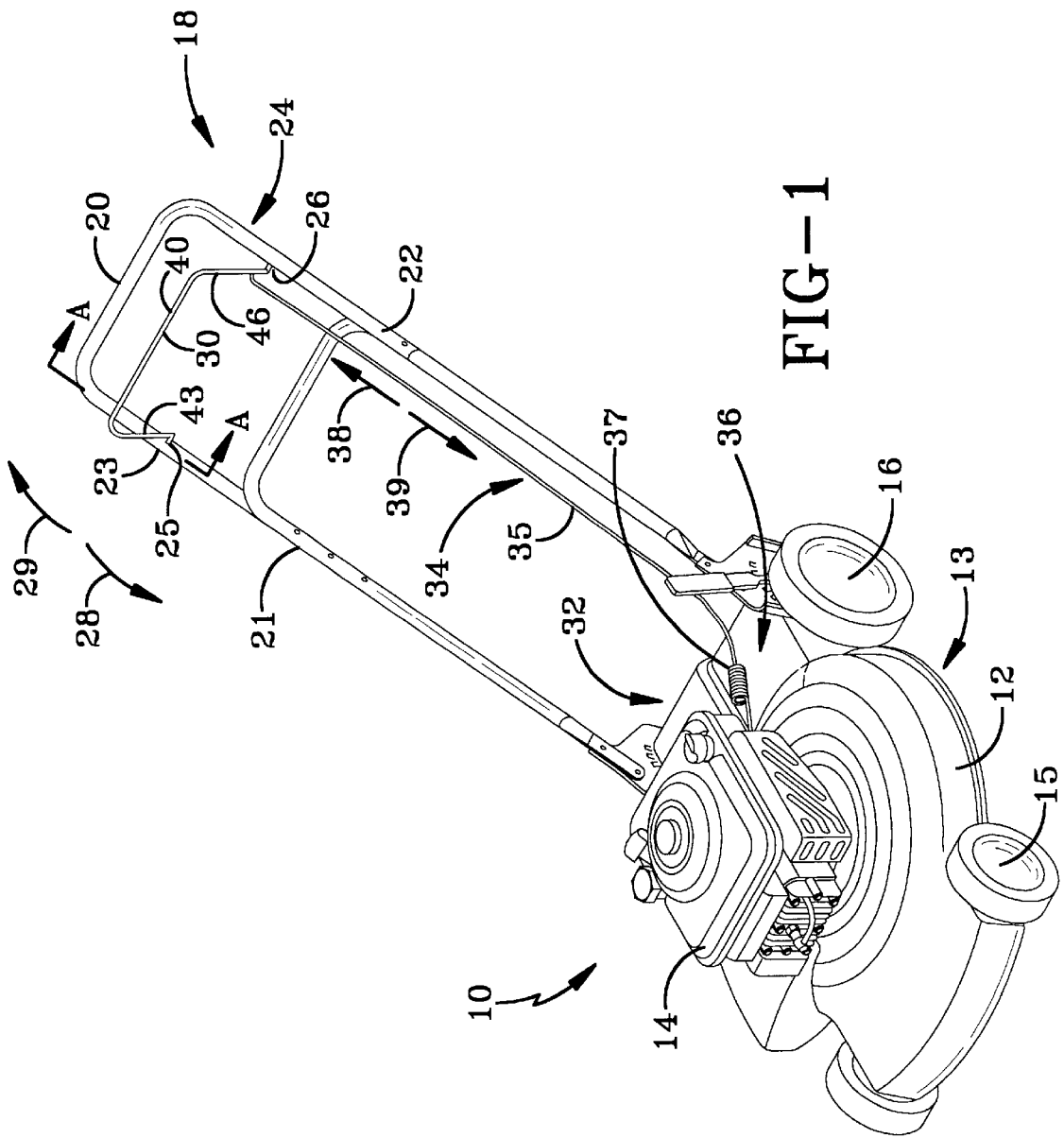
FIG. 1 is a perspective side view of a typical lawn mower that is equipped with the improved bail of the present invention.
Figure 4:
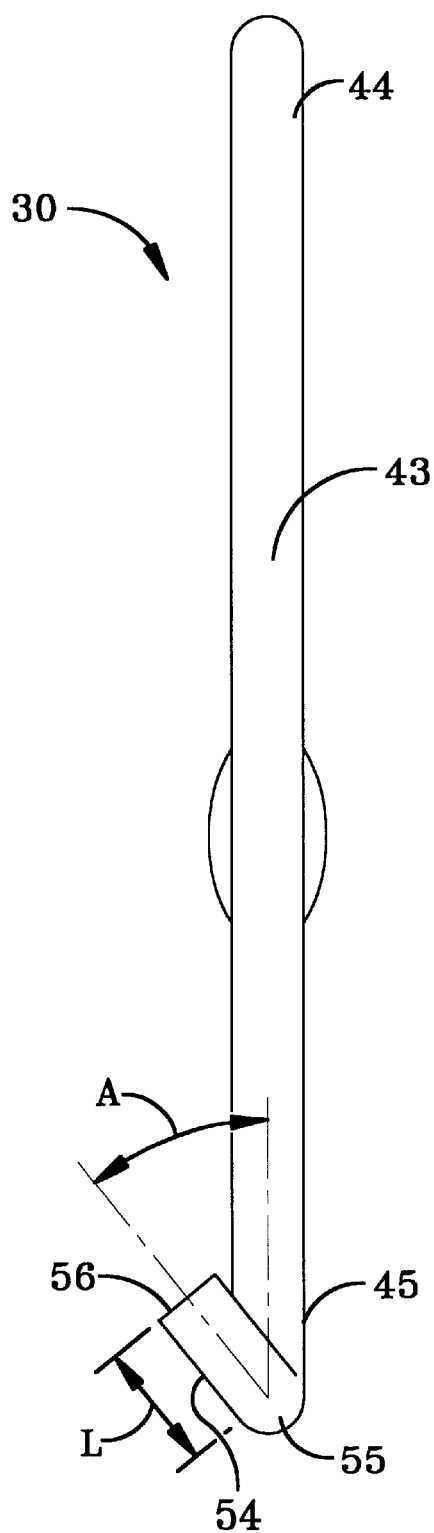
FIG. 4 is a first end elevational view of the bail taken along the line 4—4 of FIG. 2 showing the angle between the pivot stop member and the first side bar.
Figure 5:
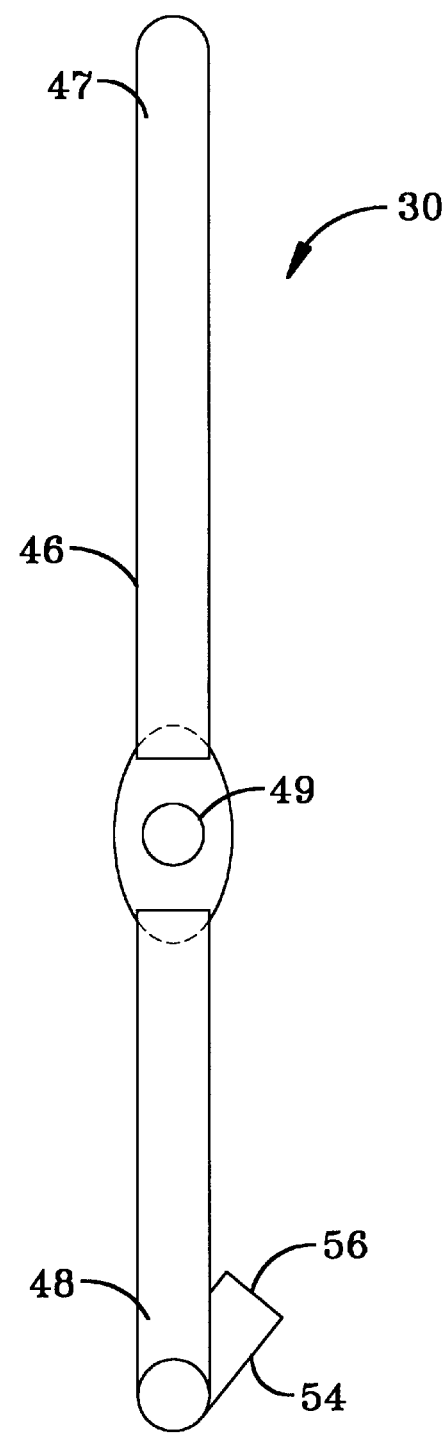
FIG. 5 is a second end elevational view of the bail taken along the line 5—5 of FIG. 2 showing the aperture in the second side bar.

Referring now to the drawings wherein the showings are for purposes of illustrating a preferred embodiment of the invention only and not for purposes of limiting the same, FIG. 1 shows a lawn mower 10 which is equipped with a bail 30 in accordance with this invention. The preferred embodiment is directed to a walk-behind lawn mower but the invention is applicable to other mowers, and other applications as well. The lawn mower 10 includes a mower deck 12 which has cutting blades 13 within it. The cutting blades 13 can be of any type currently known in the art and therefore will not be discussed in any detail. An engine 14, which can be of any type chosen with sound engineering judgement, is used to rotate the cutting blades 13 in a manner commonly known in the art and therefore will not be discussed further. The engine 14 is mounted to the mower deck 12. The lawn mower 10 also includes front and back wheels 15, 16 though wheels are not required for this invention. A control handle 20 is operatively connected to the mower deck 12 by first and second legs 21, 22. Preferably the first and second legs 21, 22 are hollow. However it is only required for this invention that the first leg 21 have a first hollow portion 23 and that the second leg 22 have a second hole 26. The first hollow portion 23 has a first hole 25 for receiving the bail 30 as will be discussed further below. Similarly, it is preferred that a second hollow portion 24 in the second leg 22 has the second hole 26 for receiving the bail 30.

Still referring to FIG. 1, the lawn mower 10 also includes an operator present control system 18 which is used to detect if the operator is in the correct position with respect to the lawn mower 10. In particular, the operator present control system 18 detects if the operator is holding the bail 30 against the control handle 20. The bail 30 is selectively pivotable in first direction 28 and second direction 29. The operator present control system 18 also includes disengaging means 32 for selectively disengaging the cutting blades 13 and connecting means 34 for connecting the bail 30 to the disengaging means 32. The disengaging means 32 can be of any type chosen with sound engineering judgement and currently known in the art such as engine kill switch, blade brake, blade brake clutch (BBC) and other similar devices. The connecting means 34 can also be of any type chosen with sound engineering judgement, but in this preferred embodiment is a cable 35. The operator present control system 18 preferably also includes a biasing means 36 for biasing the bail 30 in the first direction 28. In this preferred embodiment the biasing means 36 includes a spring 37 that is positioned between the cable 35 and the disengaging means 32. Thus, the spring 37 biases the bail 30 in first direction 28 by applying tension in a second direction 39 to the cable 35. The operator present control system 18 also includes the bail 30 which is operatively connected to the first and second legs 21, 22 of the control handle 20 as will be discussed further below. It should be noted that it is not necessary for the bail 30 of this invention to be used with an operator present control system.

With reference now to FIGS. 1–5, the bail 30 of the preferred embodiment includes a cross bar 40 having first and second ends 41, 42. Rigidly connected to the first end 41 of the cross bar 40 is a first end 44 of a first side bar 43 that also has a second end 45. Similarly, rigidly connected to the second end 42 of the cross bar 40 is a first end 47 of a second side bar 46 that also has a second end 48. In this preferred embodiment the second side bar 46 has an aperture 49 for receiving the cable 35 by means currently known in the art. Rigidly connected to the second end 45 of the first side bar 43 is a first shaft 50. Similarly, rigidly attached to the second end 48 of the second side bar 46 is a second shaft 51. The first and second shafts 50, 51 are pivotably received inside the first and second holes 25, 26 of the first and second hollow portions 23, 24 of the first and second legs 21, 22.

With reference now to FIGS. 2–5, the bail also includes a pivot stop member 54 that has first and second ends 55, 56. The first end 55 of the pivot stop 54 is rigidly connected to the first shaft 50. Though not necessary for this invention, it is preferred that the first shaft 50 and the pivot stop 54 are integrally formed of a single bar. In fact, in this preferred embodiment the bail 30 which includes the cross bar 40 the first and second side bars 43, 46, the first and second shafts 50, 51 and the pivot stop member 54 are all integrally formed of a single bar. By integrally formed of a single bar it is meant that a bar, that is preferably made of steel, is bent by means commonly known in the art, into the shape shown in FIGS. 2–5. Of course other shapes could be used for this invention. The pivot stop member 54 has a length L which will be discussed further below. The pivot stop member 54 forms an angle A with respect to the first side bar 43 that is within the range of 5° to 90°. In the preferred embodiment, the angle A is within the range of 35° to 45°. The purpose of the angle A will be discussed further below.

Figure 6:
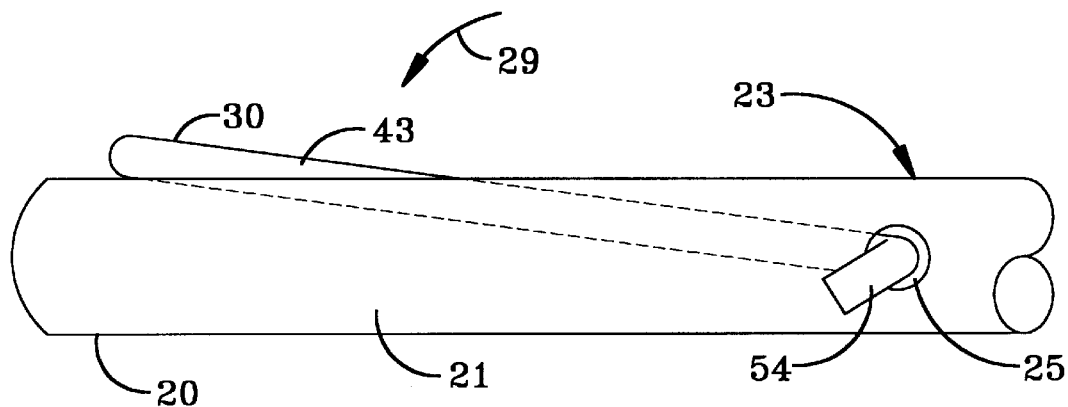
FIG. 6 is a sectional view taken along the line A—A of FIG. 1 showing the bail fully pivoted in a second direction, disabling the disengaging means and thereby permitting the cutting blades to rotate.
Figure 7:
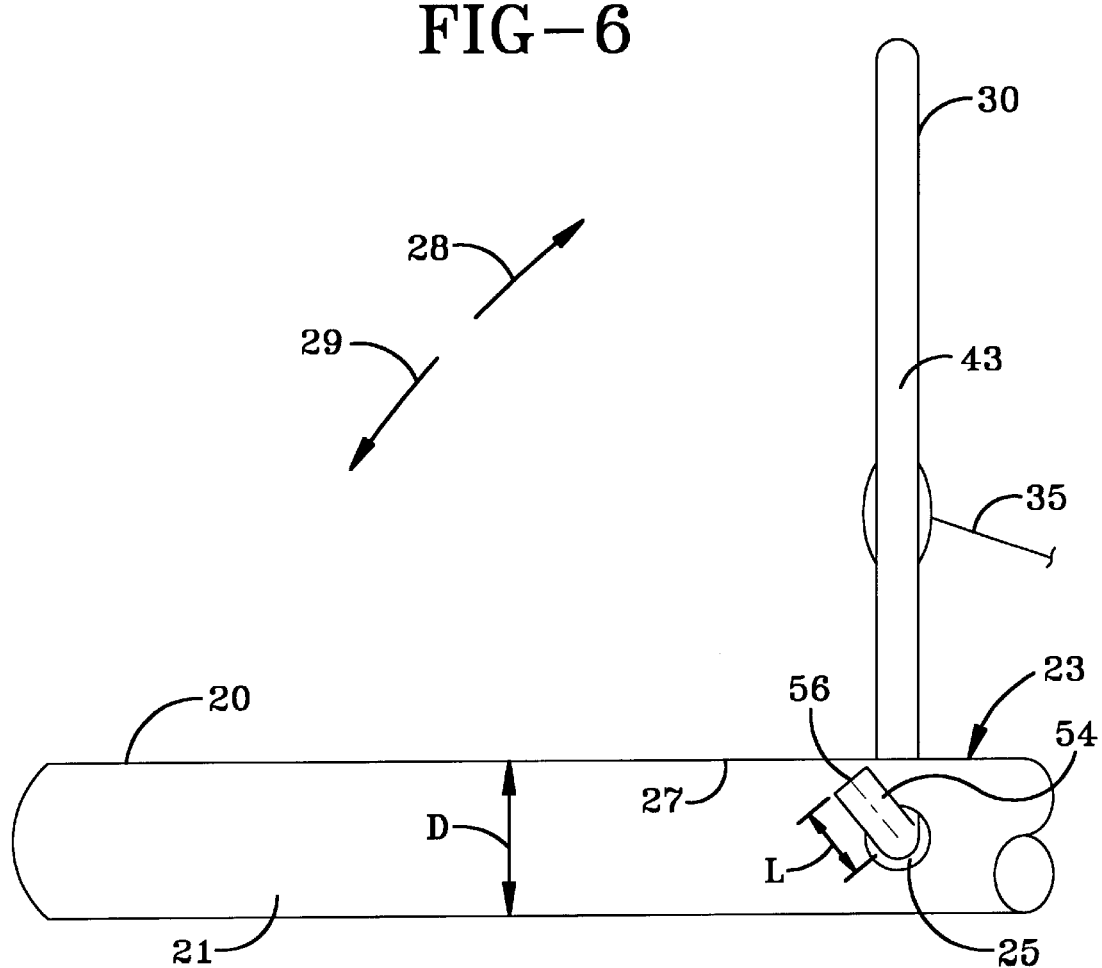
FIG. 7 is a sectional view taken along the sides A—A of FIG. 1 showing the bail fully pivoted in a first direction, enabling the disengaging means and thereby preventing the cutting blades from rotating.

With reference now to FIGS. 6–7, the position of the pivot stop member 54 within the first hollow portion 23 of the first leg 21 will now be discussed. The first hollow portion 23 has an inner diameter D and an inner surface 27. The length L of the pivot stop member 54 should be within the range of (0.4 times the inner diameter D) and (the internal diameter D) but is preferably within the range of (0.5 times the inner diameter D) and (0.7 times the inner diameter D). FIG. 7 shows the second end 56 of the pivot stop member 54 contacting the inner surface 27 of the first hollow portion 23 of the first leg 21 of the control handle 20.

With reference now to FIGS. 1, 6–7, the operation of the bail 30 will now be discussed. FIG. 7 shows the position of the bail 30 when the lawn mower 10 is in a normal inoperative condition. Before the engine 14 can be started, the operator must pivot the bail 30 in second direction 29. This motion causes a tension force to be applied to the cable 35 in first direction 38. In this way, the operator overcomes the biasing force of the spring 37 and thereby disables the disengaging means 32. When the bail 30 is moved in second direction 29 until it reaches the position shown in FIG. 6, the operator may then start the engine 14 and thereby rotate the cutting blades 13. As long as the bail 30 remains in the position shown in FIG. 6, the operator may use the lawn mower 10 for mowing an associated lawn (not shown) in a manner commonly known in the art. Should the operator for any reason release the bail 30, the bail 30 will be forced to pivot in first direction 28 by the biasing force of the spring 37 applying a tension in the second direction 39 to the cable 35. The bail 30 will continue to pivot in first direction 28 until the second end 56 of the pivot stop member 54 contacts the inner surface 27 of the first hollow portion 23. When this occurs, the bail 30 will be prevented from pivoting any further in first direction 28. With the bail 30 positioned as shown in FIG. 7, the disengaging means 32 will be enabled and will thus prevent the cutting blades 13 from rotating preferably by stopping the engine 14.

The invention has been described with reference to a preferred embodiment. Obviously, modifications and alterations will occur to others upon a reading and understanding of this specification. It is intended to include all such modifications and alterations insofar as they come within the scope of the appended claims or the equivalence thereof.

Having thus described the invention, it is now claimed:

1. A lawn mower, comprising:
   (1) a mower deck with cutting blades;
   (2) an engine for selectively rotating said cutting blades, said engine being mounted to said mower deck;
   (3) a control handle with first and second legs, said first and second legs being operatively connected to said mower deck, said first leg having a first hollow portion with a first hole and said second leg having a second hole;
   (4) disengaging means for selectively disengaging the cutting blades;
   (5) a bail that includes
      (a) a cross bar having first and second ends,
      (b) first and second side bars each having first and second ends, said first end of said first side bar being rigidly connected to said first end of said cross bar, said first end of said second side bar being rigidly connected to said second end of said cross bar,
      (c) first and second shafts for selective pivotable connection with said first and second holes respectively, said first shaft being rigidly connected to said second end of said first side bar, said second shaft being rigidly connected to said second end of said second side bar, and
      (d) a pivot stop member, said pivot stop member selectively stopping the pivoting of said bail in a first direction, said pivot stop member being rigidly connected to said first shaft, said pivot stop member being positioned within said first hollow portion of said first leg; and, (6) connecting means for connecting said bail to said disengaging means, said bail selectively disabling the cutting blades from rotating when pivoted in said first direction, said bail selectively enabling the cutting blades to rotate when pivoted in a second direction.

2. The lawn mower of claim 1 wherein said bail is integrally formed of a single bar.

3. The lawn mower of claim 2 wherein said first hollow portion of said first leg has a inner diameter D and said pivot stop member has a length L, said length L being within the range of (0.5× inner diameter D) and (0.7× inner diameter D).

4. The bail of claim 3 wherein said pivot stop member forms an angle A with respect to said first side bar, said angle A being within the range of 35° to 45°.

5. An operator present control system for use with an associated mower, the associated mower having an engine, cutting blades selectively rotatable by the engine, a control handle with first and second legs, the first leg having a first hollow portion with a first hole and the second leg having a second hole, said operator present control system comprising:

(1) disengaging means for selectively disengaging the cutting blades;

(2) a bail that includes
   (a) a cross bar having first and second ends,
   (b) first and second side bars each having first and second ends, said first end of said first side bar being rigidly connected to said first end of said cross bar, said first end of said second side bar being rigidly connected to said second end of said cross bar,
   (c) first and second shafts for selective pivotable connection with the first and second holes respectively, said first shaft being rigidly connected to said second end of said first side bar, said second shaft being rigidly connected to said second end of said second side bar, and
   (d) a pivot stop member, said pivot stop member selectively stopping the pivoting of said bail in a first direction, said pivot stop member being rigidly connected to said first shaft, said pivot stop member being positioned within said first hollow portion of said first leg; and, (3) connecting means for connecting said bail to said disengaging means, said bail selectively disabling the cutting blades when pivoted in said first direction, said bail selectively enabling the cutting blades to rotate when pivoted in a second direction.

6. The operator present control system of claim 5 further comprising:

biasing means for biasing said bail toward said first direction, said pivot stop member limiting the pivoting of said bail in said first direction.

7. A bail for use with an associated mower having a control handle with first and second leg, the first leg having a first hollow portion with a first hole and the second leg having a second hole, said bail comprising:

a cross bar having first and second ends;

first and second shafts for selective pivotable connection with the first and second holes respectively, said first shaft being operatively connected to said first end of said cross bar, said second shaft being operatively connected to said second end of said cross bar; and, a pivot stop member, said pivot stop member selectively stopping the pivoting of said bail in a first direction, said pivot stop member being rigidly connected to said first shaft, said pivot stop member being positioned within said first hollow portion of said first leg.

8. The bail of claim 7 further comprising:

first and second side bars each having first and second ends, said first end of said first side bar being rigidly connected to said first end of said cross bar, said first end of said second side bar being rigidly connected to said second end of said cross bar, said first shaft being rigidly connected to said second end of said first side bar, said second shaft being rigidly connected to said second end of said second side bar.

9. The bail of claim 7 wherein said first shaft and said pivot stop member are integrally formed of a single material.

10. The bail of claim 9 wherein said bail is integrally formed of a single bar.

11. The bail of claim 7 wherein said first hollow portion has an inner diameter D and said pivot stop member has a length L, said length L being within the range of (0.4× the inner diameter D1) and (the inner diameter D1).

12. The bail of claim 11 wherein said length L is within the range of (0.5× the inner diameter D1) and (0.7× the inner diameter D1).

13. The bail of claim 8 wherein said pivot stop member forms an angle A with respect to said first side bar, said angle A being within the range of 5° to 90°.

14. The bail of claim 13 wherein said angle A is within the range of 35° to 45°.

15. A method of stopping a bail used with an associated mower, the associated mower having a control handle with a first leg, the first leg having a first hollow portion, the method comprising the steps of:

pivoting said bail in a first direction;

contacting a pivot stop member with an inside surface of said first hollow portion of said first leg; and, stopping said bail.

16. The method of claim 15 wherein, before the step of pivoting said bail in a first direction, the method comprises the steps of:

releasing said bail; and, biasing said bail toward said first direction.

* * * * *